US010835923B2

(12) United States Patent
Xu et al.

(10) Patent No.: US 10,835,923 B2
(45) Date of Patent: Nov. 17, 2020

(54) VIBRATION DEVICE AND ELECTRONIC DEVICE

(71) Applicant: AAC Technologies Pte, Ltd., Singapore (SG)

(72) Inventors: Xiang Xu, Shenzhen (CN); Fanghua Ling, Shenzhen (CN); Mengxun Shi, Shenzhen (CN); Zhilin Chai, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 218 days.

(21) Appl. No.: 15/652,744

(22) Filed: Jul. 18, 2017

(65) Prior Publication Data

US 2018/0297072 A1 Oct. 18, 2018

(30) Foreign Application Priority Data

Apr. 14, 2017 (CN) .......................... 2017 1 0245969

(51) Int. Cl.
| | |
|---|---|
| *H02K 33/00* | (2006.01) |
| *B06B 1/04* | (2006.01) |
| *H02K 33/16* | (2006.01) |
| *H02K 33/06* | (2006.01) |
| *H02K 33/02* | (2006.01) |
| *H02K 33/18* | (2006.01) |

(52) U.S. Cl.
CPC ............. *B06B 1/045* (2013.01); *H02K 33/00* (2013.01); *H02K 33/02* (2013.01); *H02K 33/06* (2013.01); *H02K 33/16* (2013.01); *H02K 33/18* (2013.01)

(58) Field of Classification Search
CPC ..................... H02K 33/00–35/06; B06B 1/045
See application file for complete search history.

(56) References Cited

U.S. PATENT DOCUMENTS

2006/0245614 A1\* 11/2006 Ishikawa ................ H02K 33/18
381/397

\* cited by examiner

*Primary Examiner* — Ramon M Barrera
(74) *Attorney, Agent, or Firm* — IPro, PLLC; Na Xu

(57) ABSTRACT

A vibration device, including a housing having accommodating space, a vibrator, a stator and an elastic member accommodated in the housing. One of the vibrator and the stator includes a magnetic circuit unit while the other includes a coil, the vibrator includes a supporting frame fixed to the elastic member and suspended in the accommodating space by the elastic member, the supporting frame includes an accommodating cavity and, a coil or a magnetic circuit unit fixed and accommodated in the accommodating cavity. One end of the elastic member is fixedly connected with the supporting frame while anther end is fixedly connected with the housing. The supporting frame includes opposite first side walls and a second side wall forming an accommodating cavity, the first side wall is fixedly connected with the elastic member. A protrusion extends from the first side wall to the elastic member fixedly connected with the protrusion.

9 Claims, 3 Drawing Sheets

VIBRATION DEVICE AND ELECTRONIC DEVICE

TECHNICAL FIELD

The present disclosure relates to the field of vibration technologies and, in particular, to a vibration device and an electronic device including the vibration device.

BACKGROUND

A vibration device is a component that utilizes the principle of generating electromagnetic force to convert electrical energy into mechanical energy, and the vibration device is usually installed in electronic products such as portable phones, so as to produce a silent feedback signal.

However, in a traditional vibration device, a spring is arranged respectively at two opposite ends of a magnetic circuit unit, so that the magnetic circuit unit is suspended in a housing. In a vibration device having such a structure, since the limited space is provided for the spring, an arm of force of the spring is short and therefore a large stress is generated, which may affect the performance and service life of the vibration device.

Therefore, it is necessary to research and provide a vibration device with a new structure.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

Figure 1:
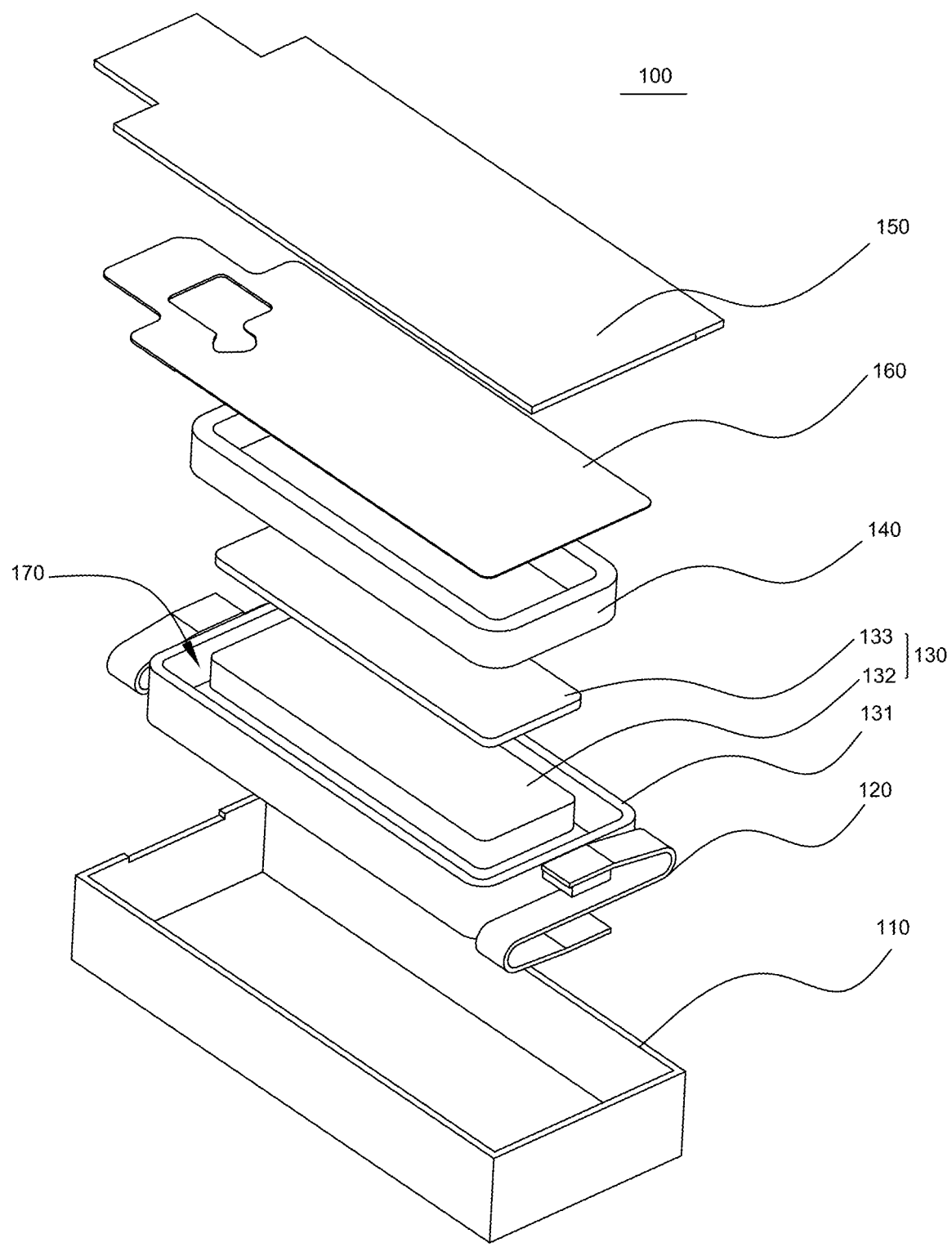
FIG. 1 is a exploded perspective schematic view of a vibration device in accordance with an exemplary embodiment of the present disclosure.
Figure 2:
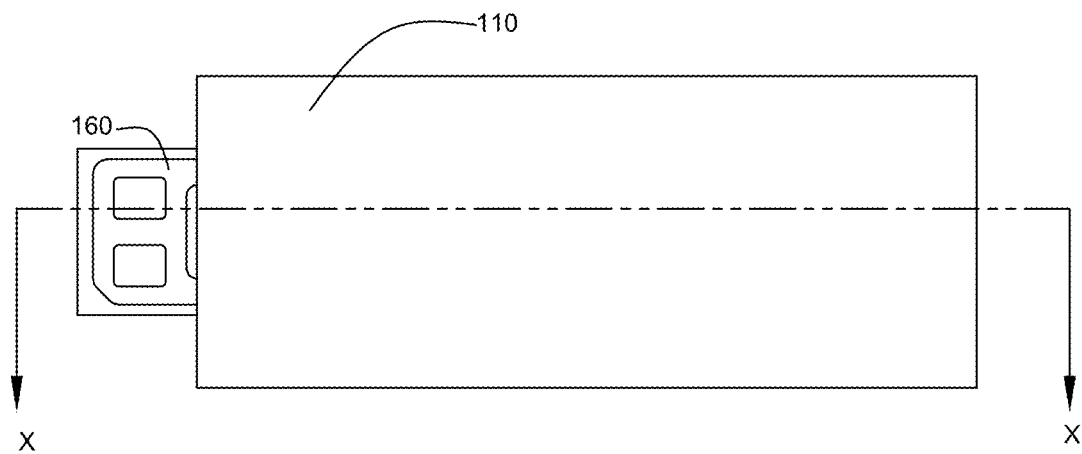
FIG. 2 is a front view of the vibration device shown in FIG. 1.

The present disclosure will be described in detail with reference to FIGS. 1-5.

With reference to FIGS. 1-5, in a first aspect of the present disclosure, a vibration device 100 is provided. The vibration device 100 includes a housing 110 having accommodating space 111, the housing 110 can be shaped in a substantial rectangular structure. A vibrator (not labeled), a stator (not labeled) and an elastic member 120 are all accommodated in the accommodating space 111. The elastic member 120 is configured to suspend the vibrator in the accommodating space 111.

One of the vibrator and the stator includes a magnetic circuit unit 130, and the other one of the vibrator and the stator includes a coil 140.

For ease of description, the vibrator including the above-mentioned magnetic circuit unit 130 and the stator including the coil 140 are taken as an example.

The coil 140 interacts with the magnetic circuit unit 130 to drive the vibrator to vibrate, so that an electronic device (e.g., a cellphone) adopting the vibration device 100 can generate linear vibration.

The housing 110 includes a bottom plate 112 and a side plate 113 bending and extending from the bottom plate 112. The side plate 113 and bottom plate 112 together form the accommodating space 111.

The vibrator includes a supporting frame 131, the supporting frame 131 is fixed to the elastic member 120 and is suspended in the accommodating space 111 by the elastic member 120. The supporting frame 131 includes an accommodating cavity 131a and the magnetic circuit unit 130. The magnetic circuit unit 130 is accommodated and fixed in the accommodating cavity 131a. Obviously, when the vibrator includes the coil 140, the coil 140 is accommodated and fixed in the accommodating cavity 131a. The vibrator can vibrate in a direction perpendicular to the bottom plate 112, one end of the elastic member 120 is fixedly connected with the supporting frame 131 while another end of the elastic member 120 is fixedly connected with the housing 110. The supporting frame 131 includes oppositely arranged first side walls 131b and a second side wall 131c which is connected with the first side wall 131b. The second side wall 131c and the first side wall 131b together form the accommodating cavity 131a. The first side wall 131b is adjacent to and fixedly connected with the elastic member 120. A protrusion 131d extends from the first side wall 131b in a direction to the elastic member 120, and the elastic member 120 is fixedly connected with the protrusion 131d.

It should be noted that, the position where the protrusion 131d extends from the first side wall 131b is not limited. For example, the protrusion 131d can be arranged in a central area of the first side wall 131b in a width direction. Obviously, the protrusion 131d can also be arranged in other areas of the first side wall 131b.

Further, it should be noted that, it is not limited that how the elastic member 120 is fixedly connected with the protrusion 131d, for example, the elastic member 120 can be welded on the protrusion 131d, or the elastic member 120 can also be fixed on the protrusion 131d in other manners.

Furthermore, it should be noted that, specific material of the elastic member 120 is not limited, for example, the elastic member 120 can be a spring or, obviously, the elastic member 120 can also be made of other elastic material.

When the vibration device 100 having the above-described structure vibrates, since the elastic member 120 is fixedly connected with the protruded protrusion 131d, space utilization of the housing 110 can be increased. Moreover, the length of the arm of force of the elastic member 120 can be increased, which provides a large interval between a first stage modal frequency and a second stage modal frequency, and effectively avoids the stress concentration phenomenon, thereby improving the strength and service life of the vibration device 100.

The elastic member 120 includes a first connecting portion 121 fixedly connected with the protrusion 131d, a second connecting portion 122 fixedly connected with the housing 110, and an elastic portion 123 which connects the first connecting portion 121 with the second connecting portion 122. The deformation direction of the elastic portion 123 is perpendicular to the bottom plate 112.

In other words, the elastic member 120 may not be of an integrally elastic structure, for example, the first connecting portion 121 fixedly connected with the protrusion 131d and the second connecting portion 122 fixedly connected with the housing 110 may not be elastic, while only the elastic portion 123 between the first connecting portion 121 and the second connecting portion 122 is elastic. Since the elastic member 120 is suspended in the housing 110, and the deformation direction of the elastic portion 123 is perpendicular to the bottom plate 112, under the action of the coil 140 and the magnetic circuit unit 130, the vibrator can vibrate in a direction perpendicular to the bottom plate 112, and thus the structure is simple. Obviously, in order to further simplify the manufacturing process of the elastic member 120, the elastic member 120 can be integrally formed, that is, the elastic member 120 can also be integrally elastic.

In order to further decrease the stress concentration phenomenon in the limited space of the housing 110, the second connecting portion 122 is arranged opposite to the first connecting portion 121. A projection of the first connecting portion 121 on the bottom plate 112 at least partially overlaps with the second connecting portion 122.

Figure 5:
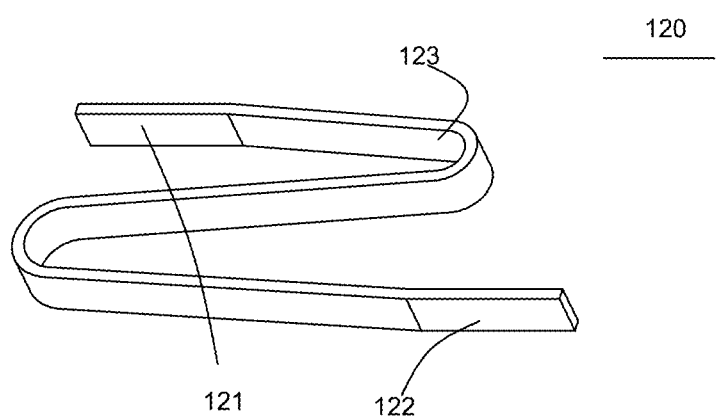
FIG. 5 is a structural schematic view of an elastic member in accordance with an exemplary embodiment of the present disclosure.

Specifically, as shown in FIG. 5, the above elastic member 120 is integrally of an S-shaped structure, that is, the elastic portion 123 between the first connecting portion 121 and the second connecting portion 122 bends and extends along a direction perpendicular to the bottom plate 112. In this way, the length of the arm of force of the elastic member 120 can be increased, so that the stress applied on the elastic member 120 can be more uniform, and the stress concentration phenomenon can be decreased.

In order to make for applied on the elastic member 120 more uniform, the projection of the first connecting portion 121 on the bottom plate 112 can totally overlap with the second connecting portion 122. That is, the sizes of the first connecting portion 121 and the second connecting portion 122 respectively correspond to the connecting positions of the protrusion 131d and the housing 110 which, for example, are respectively located in the central area in the width direction of the protrusion 131d and the central area in the width direction of the housing 110.

In addition, in order to make the protrusion 131d be more firmly connected with the first connecting portion 121, the extending length of the protrusion 131d can be greater than the width of the first connecting portion 121 of the elastic member 120.

The magnetic circuit unit 130 is fixed to the bottom plate 112 and extends into the accommodating cavity 131a. A gap 170 between the magnetic circuit unit 130 and the supporting frame 131 is formed, that is, the size of the magnetic circuit unit 130 should be smaller or slightly smaller than the size of the supporting frame 131 so that a gap 170, a magnetic gap, can be formed therebetween. The coil 140 is disposed in the gap 170 and fixed to the supporting frame 131, and the coil 140 winds the periphery of the magnetic circuit unit 130 and is spaced from the magnetic circuit unit 130. In other words, the coil 140 is located in the magnetic gap 170.

Figure 4:
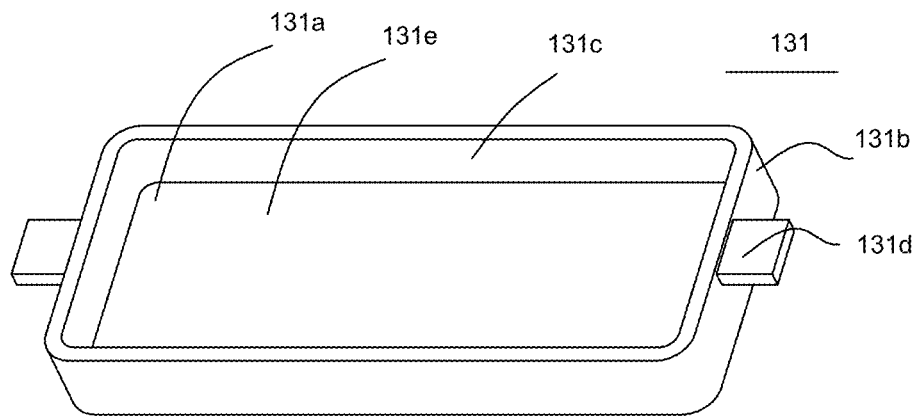
FIG. 4 is a structural schematic view of a supporting frame in accordance with an exemplary embodiment of the present disclosure.

As shown in FIG. 4, the supporting frame 131 further includes a bottom wall 131e parallel to the bottom plate 112. The first side wall 131b and the second side wall 131c are formed by bending and extending from an edge of the bottom wall 131e in a direction away from the bottom plate 112.

As shown in FIG. 1 and FIG. 4, the above-described magnetic circuit unit 130 is fixed to the bottom wall 131e, and the coil 140 is fixed to the bottom plate 112. The coil 140 extends into the accommodating cavity 131a and winds the periphery of the magnetic circuit unit 130 and is spaced from the magnetic circuit unit 130.

In order to further make the force applied to the elastic member 120 uniform, the elastic member 120 is arranged in pair, and the pair of elastic members 120 is arranged symmetrically on two opposite sides of the supporting frame 131.

In other words, the protrusion 131d is respectively provided on two opposite first side walls 131b, and the protrusion 131d is provided corresponding to the elastic member 120, and the above-described elastic member 120 is respectively fixedly connected with the corresponding protrusion 131d.

Figure 3:
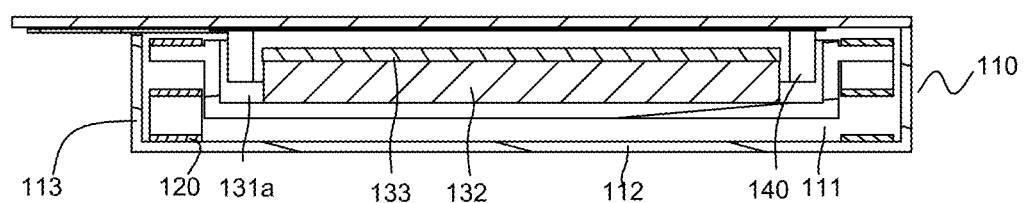
FIG. 3 is a cross-sectional view along the line X-X in FIG. 2.

With reference to FIG. 1 and FIG. 3, in order to further improve the vibrating performance of the vibration device 100, the magnetic circuit unit 130 includes a magnet 132 and a pole plate 133, one side of the magnet 132 is fixed to the supporting frame 131 or the bottom plate 112, and another side of the magnet 132 is fixed to the pole plate 133.

In other words, when the supporting frame 131 does not include the bottom wall 131e, the magnet 132 can extend out of the accommodating cavity 131a in a direction to the housing 110, so as to be fixedly connected with the bottom plate 112. When the supporting frame 131 includes the bottom wall 131e, the magnet 132 can be fixedly connected with the bottom wall 131e of the supporting frame 131.

As shown in FIG. 1 and FIG. 3, in order to seal the vibration device 100, the housing 110 further includes a cover plate 150 disposed opposite to the bottom plate 112. The cover plate 150 covers a side (which is away from the bottom plate 112) of the side wall 113 and seals the accommodating space 111. The cover plate 150 can be formed integrally with the housing 110 or be an individual component. In order to improve the sealing effect, the shape of the cover plate 150 shall be the same as the shape of a printed circuit board ((Printed Circuit Board, PCB), which will be illustrated later) 160, so that the cover plate 150 can also completely cover the PCB 160 when the cover plate 150 completely covers the housing 110.

As shown in FIG. 1 and FIG. 3, the coil 140 is fixedly arranged on the cover plate 150 and is arranged on a side of the cover plate 150 facing the housing 110. That is, the coil 140 is between the cover plate 150 and the housing 110.

In order to conduct the above-described coil 140, so that a magnetic circuit can be formed in the interior of the vibration device 100, the vibration device 100 further includes the PCB 160. The PCB 160 is disposed between the cover plate 150 and the coil 140, the coil 140 is electrically connected with the PCB 160, and the coil 140 is fixed to the side of the cover plate 150 facing the housing 110 through the PCB 160.

The specific structure of the PCB 160 is not limited, for example, the PCB 160 can be of a flexible PCB structure, obviously, the PCB 160 can also be of other PCB structures.

In a second aspect of the present disclosure, an electronic device (not shown in the figures). The electronic device includes a vibration device 100, and the vibration device 100 is the vibration device 100 as previously described.

The above is a specific application scenario of the vibration device 100. The electronic device, for example, can be an electronic product such as a cellphone, etc., when the above-described vibration device 100 is configured into the cellphone, the vibration device 100 can vibrate in a direction perpendicular to the cellphone screen, which makes the cellphone screen vibrate and sound. Since the vibration device 100 in the electronic device has the structure as described above, force applied to the elastic member 120 is more uniform, which can effectively avoid the stress concentration phenomenon, improves the strength and service life of the vibration device 100, thereby improving the strength and service life of the electronic device.

The above merely shows embodiments of the present disclosure, it should be noted that, improvements can be made by those skilled in the art without departing from the inventive concept of the present disclosure, however, these shall belong to the protection scope of the present disclosure.

What is claimed is:

1. A vibration device, comprising:
a housing having accommodating space, the housing comprises a bottom plate and a side plate bending and extending from the bottom plate, the side plate and the bottom plate form accommodating space,
a vibrator accommodated in the housing,
a stator accommodated in the housing, and
an elastic member accommodated in the housing, configured to suspend the vibrator in the accommodating space
wherein one of the vibrator and the stator comprises a magnetic circuit unit, and the other one of the vibrator and the stator comprises a coil,
wherein the vibrator comprises a supporting frame which is fixed to the elastic member and suspended in the accommodating space by the elastic member, and the supporting frame comprises an accommodating cavity and a coil or a magnetic circuit unit, wherein the coil or the magnetic circuit unit is accommodated in and fixed to the accommodating cavity; the vibrator vibrates along a direction perpendicular to the bottom plate, one end of the elastic member is fixedly connected with the supporting frame while the other end of the elastic member is fixedly connected with the housing; the supporting frame comprises oppositely arranged first side walls and a second side wall connected with the first side wall and forming an accommodating cavity together with the first side wall, the first side wall is adjacent to and fixedly connected with the elastic member, a protrusion protrudes from a central portion of the first side wall in a direction to the elastic member, and the elastic member is fixedly connected with the protrusion.

2. The vibration device as described in claim 1, wherein the elastic member comprises a first connecting portion fixedly connected with the protrusion, a second connecting portion fixedly connected with the housing, and an elastic portion which connects the first connecting portion with the second connecting portion, a deformation direction of the elastic portion is perpendicular to the bottom plate.

3. The vibration device as described in claim 2, wherein the second connecting portion is arranged opposite to the first connecting portion and a projection of the first connecting portion on the bottom plate at least partially overlaps with the second connecting portion.

4. The vibration device as described in claim 2, wherein the supporting frame comprises a bottom wall parallel to the bottom plate, and the first side wall and the second side wall are formed by bending and extending from an edge of the bottom wall in a direction away from the bottom plate.

5. The vibration device as described in claim 4, wherein the magnetic circuit unit is fixed to the bottom wall, and the coil is fixed to the bottom plate, and the coil extends into the accommodating cavity and winds a periphery of the magnetic circuit unit and is spaced from the magnetic circuit unit.

6. The vibration device as described in claim 5, wherein the elastic member is provided in pair, and the pair of elastic members are arranged symmetrically on two opposite sides of the supporting frame.

7. The vibration device as described in claim 1, wherein the magnetic circuit unit comprises a magnet and a pole plate, wherein the magnet and the pole plate are arranged by stacking, one side of the magnet is fixed to the supporting frame or the bottom plate, and the other side of the magnet is fixed to the pole plate.

8. The vibration device as described in claim 1, wherein the housing further comprises a cover plate disposed opposite to the bottom plate, and the cover plate is connected with a side of the side wall away from the bottom plate and covers the side wall, and the cover plate seals the accommodating space.

9. An electronic device, wherein the electronic device comprises the vibration device as described in claim 1.

* * * * *